Figure 1:
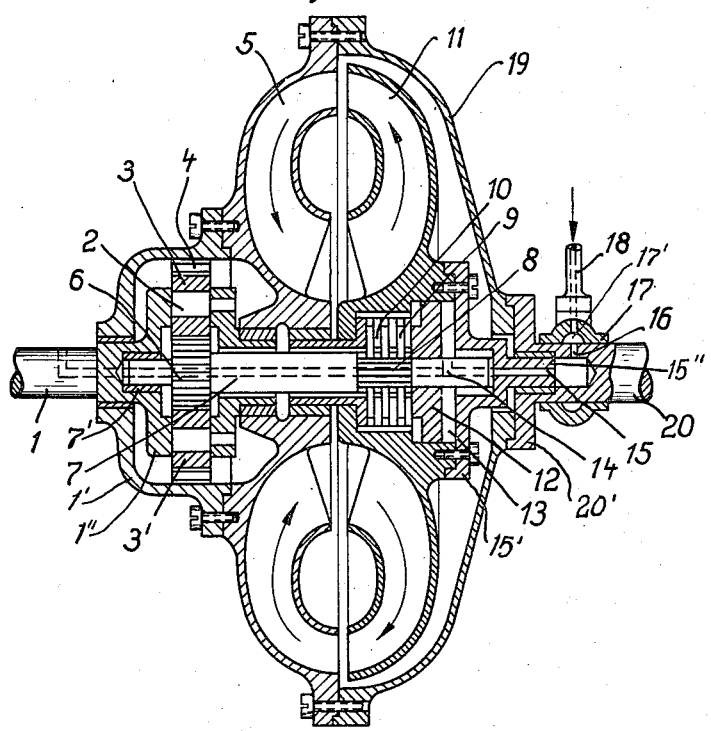

Dec. 31, 1940.   H. FÖTTINGER   2,226,760
POWER TRANSMISSION DEVICE
Filed Nov. 18, 1938

Inventor:
Hermann Föttinger,
by Harry C Dunham
His Attorney

Patented Dec. 31, 1940

2,226,760

UNITED STATES PATENT OFFICE 2,226,760

POWER TRANSMISSION DEVICE

Hermann Föttinger, Berlin-Charlottenburg, Germany

Application November 18, 1938, Serial No. 241,275
In Germany November 19, 1937

2 Claims. (Cl. 74—189.5)

My invention relates to power transmission devices, and more particularly to a power transmission device comprising a mechanical gear train and a hydraulic gear. The mechanical gear train illustrated and described in this application is a standard form of an epicyclic gear train whereby power from a driving member is divided and transmitted to a driven member through two channels, one channel being a direct mechanical connection and the other channel being through the hydraulic gear. The hydraulic gear may be a coupling consisting of a pump wheel and a turbine wheel, or a torque converter comprising besides the pump wheel and the turbine wheel a guide wheel. This type of hydraulic gear is described in greater detail in U. S. Patents 1,199,359 and 1,199,361, issued to Föttinger.

One object of my invention is the provision of greater flexibility, and to reduce losses, in power transmissions of this type.

For further objects and advantages of my invention reference is had to the following specification when taken in connection with the accompanying drawing, and its scope will be pointed out in the accompanying claims.

The accompanying drawing illustrates, in Fig. 1, a vertical cross-section of a power transmission device embodying my invention.

Referring to the drawing, the driving shaft 1 projects into a housing 1'' in which it expands into a disk 1''' which carries several pins 2. The pins 2 are equally spaced about the axis of the shaft 1 and carry respectively planet gears 3 and 3', engaging the toothed outer ring-gear, or orbit gear, 4 which is attached to the wall of the housing 1'. The housing 1' is rigidly connected to the turbine wheel 5 of the hydraulic coupling. The planet gears also engage a sun gear 6 mounted on a connecting shaft 7. This shaft 7 is supported at one end in a bearing 7' provided in the end of shaft 1 and carries on its grooved part 8 one or more clutch plates 9 engaging with similar plates 10 fixed by grooves to the pump wheel 11 of the hydraulic coupling. The plates may be pressed together in any way known for such clutches, for instance by hydraulic means consisting of a piston 12, comprising a ring, or disk, axially movable on the shaft 7 and inside of the cylindrical space 13 provided in the hub of the pump wheel 11. Oil for moving the piston 12 is supplied to the space 13 through oil ducts 14, 15 and 16. Oil duct 14 is in the shaft 7. Oil duct 15 is provided in a member 15' which is attached to the pump wheel 11 to close the space 13 in the hub of the pump wheel. This member 15' is provided with a shaft extension 15'' for supporting the pump wheel. The shaft extension 15'' of member 15' rests in a bearing provided in a shaft 20 and in a disk 20', the disk 20' being integral with the shaft 20 and also attached to the casing 19. Oil reaches the duct 15 through the duct 16 in the shaft 20 from a sleeve 17 surrounding the shaft 20 and provided with an annular channel 17'. This annular channel is supplied with oil through an oil pipe 18. The oil ducts may also lead through the left side of the shaft 7 and through the shaft 1, as indicated by dotted lines. The casing 19 of the hydraulic coupling connects the turbine wheel 5 with the driven shaft 20.

The operation is as follows:

The shaft 1 drives the planet gears 3, 3', from which the power is divided and transmitted in one channel through the toothed rim 4, fixed to the turbine wheel 5, the casing 19 to the driven shaft 20, and in another channel through the sun gear 6, the shaft of which in ordinary service is connected by the clutch plates 9 and 10 to the pump wheel 11, circulating oil or water through the turbine 5 and back through 11 in the sense of the arrows. In such a way one part of power is transmitted mechanically from shaft 1 to shaft 20, while another part is transformed first into hydrokinetic energy and then added to the mechanically transmitted power.

When the driven shaft 20 and the toothed rim 4 however are kept stationary, the epicyclic gear tends to impart a considerably increased speed to the pump wheel 11. This would cause a strong ventilation, if the hydraulic coupling were emptied, or an enormous increase of primary and secondary power, if the hydraulic coupling remains filled.

By closing and opening the clutch in the described manner difficulties and losses are avoided, so that the driven shaft 20 can be freed of substantially all torque thus allowing an easy shifting of any toothed change gear interposed between the shaft 20 and the driven member (machine, axle). In the known combinations of a hydraulic coupling and a mechanical clutch the latter must be built for the full power transmitted from the inlet to the outlet shaft, while my invention necessitates a clutch of one fourth or fifth only, of that capacity, in the hydrokinetic channel of the power transmission, the larger mechanical power transmission remaining unchanged, i. e. without detachable means.

What I claim as new and desire to secure by Letters Patent of the United States is:

1. In a power transmission device, the combination of a drive shaft, an epicyclic gearing comprising a sun gear, an orbit gear and planet gears, a support for said planet gears attached to said drive shaft, a hydraulic coupling having a turbine wheel and an impeller wheel, one of said wheels being connected to said orbit gear, and a clutch operable to connect and to disconnect said sun gear and the other of said hydraulic coupling wheels.

2. In a power transmission device, the combination of a drive shaft, an epicyclic gearing comprising a sun gear, an orbit gear and planet gears, a support for said planet gears attached to said drive shaft, a hydraulic coupling having a turbine wheel connected to rotate with said orbit gear, an impeller wheel, a clutch operable to connect and to disconnect said impeller wheel and said sun gear, and a driven shaft connected to rotate with said turbine wheel.

HERMANN FÖTTINGER.